United States Patent

Cewers

(10) Patent No.: US 8,857,794 B2
(45) Date of Patent: Oct. 14, 2014

(54) METHOD AND DEVICE FOR MECHANICAL TRIMMING

(75) Inventor: Göran Cewers, Limhamn (SE)

(73) Assignee: Mindray Medical Sweden AB, Sundbyberg (SE)

( * ) Notice: Subject to any disclaimer, the term of this patent is extended or adjusted under 35 U.S.C. 154(b) by 819 days.

(21) Appl. No.: 13/106,461

(22) Filed: May 12, 2011

(65) Prior Publication Data

US 2011/0283848 A1   Nov. 24, 2011

Related U.S. Application Data

(60) Provisional application No. 61/345,733, filed on May 18, 2010.

(51) Int. Cl.
*B66F 3/36* (2006.01)

(52) U.S. Cl.
USPC .......................................... 254/100; 254/103

(58) Field of Classification Search
CPC .............. B66F 3/08; B66F 5/04; B66F 5/025; B66F 7/02; B66F 7/14; B25B 1/10; B25B 5/10
USPC ............. 254/100, 102, 134, 2 B; 269/43, 246
See application file for complete search history.

(56) References Cited

U.S. PATENT DOCUMENTS

| | | | |
|---|---|---|---|
| 1,532,702 A | 4/1925 | Lane | |
| 3,786,551 A * | 1/1974 | Gregg et al. | 29/266 |
| 4,043,415 A * | 8/1977 | Luchinger | 177/255 |
| 4,203,577 A * | 5/1980 | Hafner | 254/100 |
| 5,135,205 A * | 8/1992 | Bedard | 269/17 |
| 6,499,722 B1 * | 12/2002 | Kawasaki | 254/103 |
| 6,685,169 B2 * | 2/2004 | Shim | 254/103 |
| 7,434,783 B2 * | 10/2008 | Arzouman | 254/8 B |
| 2002/0171070 A1 * | 11/2002 | Shim | 254/103 |

FOREIGN PATENT DOCUMENTS

WO   WO2007123594 A1   11/2007

* cited by examiner

*Primary Examiner* — Lee D Wilson
(74) *Attorney, Agent, or Firm* — Kory D. Christensen; Stoel Rives LLP

(57) ABSTRACT

A device for trimming the thickness of a mechanical body is disclosed. The trimming is performed by screwing a screw through a threaded hole and having the end of the screw pressing against the center of a disk element, which, by deformation, acts as a lever against an adjacent body.

9 Claims, 3 Drawing Sheets

METHOD AND DEVICE FOR MECHANICAL TRIMMING

CROSS-REFERENCE TO RELATED APPLICATION(S)

This application claims the benefit of U.S. Provisional Application No. 61/345,733, filed May 17, 2010, which is incorporated herein by reference.

TECHNICAL FIELD

The following disclosure pertains to mechanical trimming.

SUMMARY OF THE DISCLOSURE

A method and device for using trimming to compensate for mechanical tolerances in tolerance critical designs is disclosed.

DETAILED DESCRIPTION

Figure 1:
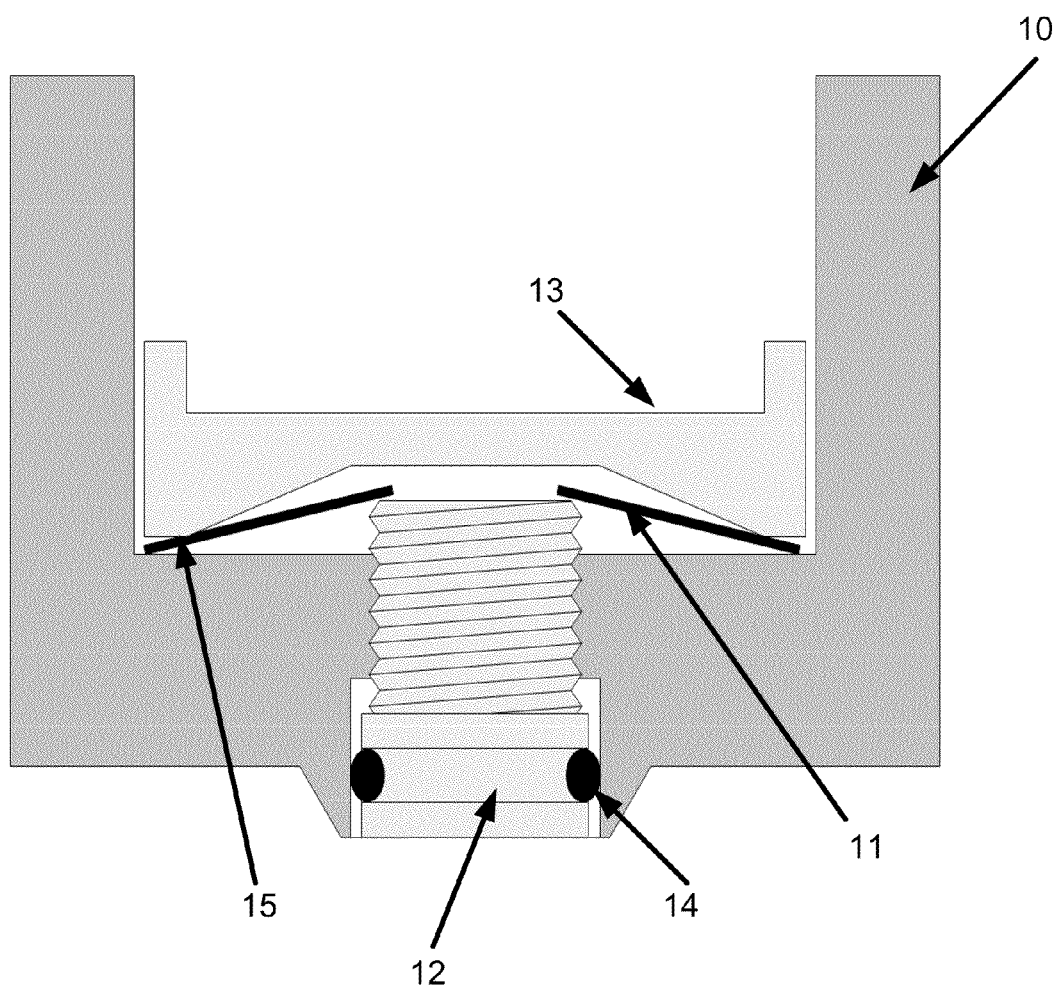
FIG. 1 is a schematic view showing an exemplary embodiment using a disc member.

When designing mechanical systems, it is common for components of different construction materials to be used. Special requirements might exist, such as hardness, exhaustion properties, corrosion resistance, surface roughness, transparency, color, electrical properties, melting point, cost, etc.

When different materials are combined, it is common for the parts used to have different mechanical tolerances. These tolerances may include dimensional tolerances or tolerances in rigidity of the parts used. For example, the tolerances in rigidity of a spring are usually quite large, which is why this also results in mechanical dimension tolerances for a specific force when a spring is included in a mechanical system.

In many cases, the tolerances may be improved by mechanical adjustment. This is not always possible, however, if the parts used can be destroyed by adjustment or if the adjustment process is too costly. A better alternative is to keep the tolerances on the parts and add a mechanical trimming device.

Examples of tolerance critical structures may be devices for micro-positioning, control of laser beams, microscope focusing (atomic, optical, and ultrasound), semiconductor manufacture, sensors for micro-positioning, spectroscopy, and optical benches.

In micro-positioning, it is common for positioning to be controlled by an actuator in the form of a piezoelectric crystal stack. A piezoelectric crystal stack has an actuation range of approximately 0.1% of the length of the stack. At the same time, the stack may also have a length tolerance of 0.5%. This results in a need for mechanical trimming.

A simple method of mechanical trimming is to use an ordinary screw through a threaded hole and through a mechanical anchoring. The lead of normal threads, even down to M2, may be as much as 400 µm/turn. Trimming of a few pm would hardly be possible with such a screw. One way of improving a trimming screw is to give it two opposing threads with a small difference in pitch between them. This principle is described in U.S. Pat. No. 1,532,702. However, the disadvantages of this principle are that it is relatively costly, requires low surface roughness in the threads, and requires space.

The disclosure relates to a device and a method for trimming the thickness of a mechanical body. The trimming is performed by screwing a screw through a threaded hole, with the end of the screw pressing against a center of a disk member or washer, which by deformation acts as a lever against an adjacent body. This reduces the effect of the lead of the screw to the transmission determined by the above-mentioned lever, and the adjacent body is moved a substantially shorter distance than the screw.

According to one aspect, a mechanical trimming device comprises an adjustable screw and a first body having at least one threaded through hole enclosing said adjustable screw. The device may further include a movable second body that is movable relative to said first body and has a cavity into said second body, wherein said cavity accommodates the proximal end of said screw when said second body is laid against said first body. In one embodiment, the device includes at least one disc member having a center and an outer edge that is positioned between said first and said second bodies, wherein said cavity is facing said disc member and has an edge lying inside of said outer edge of said disc member, so that said outer edge of said disc member lies between said first and said second body; and said screw, when adjusted, can raise said center of said disc member in that said disc member works as a lever having a first distributed contact point against said cavity edge of said second body, and a second distributed contact point along said outer edge of said disc member against the surface of said first body, wherein said first body is moved in the axial direction of said screw with a substantially smaller motion than said screw.

By using this device, it is possible, using a screw, to adjust the second body relative to the first movable body, e.g., orthogonally relative to the surface of the second body. The adjustment of the second body, which occurs when screwing the screw, is extremely small in relation to the motion of the screw, e.g., in the micrometer range. The adjustments using the above-mentioned device may be performed either vertically or horizontally, depending on the positioning of the device. When trimming, the first body is moved along the axial direction of the screw with a movement substantially less than the screw.

When the trimming has been completed, the disc member locks the adjustment screw in its position, provided there is a counter force through the second body keeping the disc member in a pre-stressed position. Thus, the trimming cannot come undone.

This provides a cost effective and simple way to obtain a device usable for trimming by micro-positioning, such as controlling laser beams, microscope focusing, semiconductor manufacturing, sensors for micro-positioning, spectroscopy, and optical benches. For example, the device may be used for mechanical trimming of the stroke length of a piezoelectric crystal stack or other types of actuator units.

In some embodiments, the mechanical trimming device has the disc member slits running towards the center. In some embodiments, the disc member may also include, towards the center, running sectioned elements. The disc member may be circular in shape but may also be polygonal. However, the geometry is not restrained to these shapes, but may also be ellipsoids or similar.

The disc member may be designed in many ways, as long as the general principles described herein are complied with. For example, the disc member may have a hole in the center where the slits meet. It may also be large sections. The disc member may also be designed with a solid center, where the screw presses, with outwards directing sections or arms.

In some embodiments, the mechanical trimming device is connected in series to a mechanical temperature compensation element. This configuration of the device also provides, if required, compensation for changes in the ambient temperature, e.g., the stroke length of an actuator unit, which, in one embodiment, may be a piezo actuator.

In yet another embodiment, the mechanical trimming device may be connected in series to an actuator unit and to a mechanical temperature compensation element, if necessary.

In another aspect, the disclosure includes a method for trimming an orthogonal direction relative to the surface of the mechanical trimming device, wherein the method comprises adjusting a screw for raising the center of a disc member so that the disc member acts as a lever having a first distributed contact point against a second body's edge (relative to a first movable body) and a second distributed contact point along the outer edge of the disc member against a surface of a first body.

Referring to FIG. 1, a device, according to an embodiment of the disclosure, is obtained by a disc element 11 being installed between a chassis 10 and a movable circular body 13. The chassis 10 comprises an adjustment screw 12 positioned under the center of disc member 11. When the adjustment screw 12 is screwed into the chassis 10, the center of washer 11 is raised.

Figure 2:
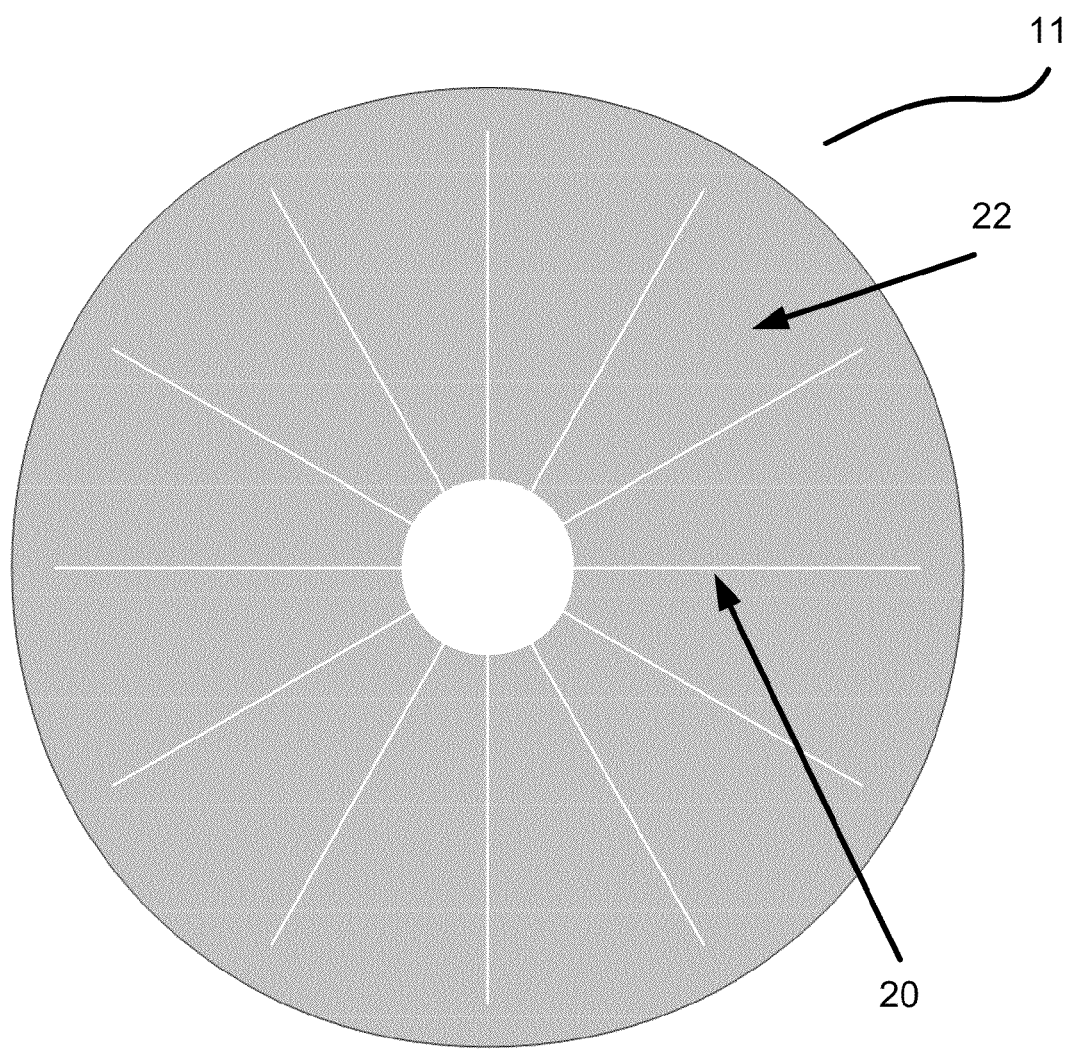
FIG. 2 shows a detailed view of the disc member in FIG. 1.

Segment 22, as shown in FIG. 2, which is formed by slits 20 in disc member 11, will then bend upwards, and each segment may be regarded as a lever acting on the outer edge of the disc member 11 against the chassis 10 and at the radius according to the arrow 15 on the movable body 13. The motion of the screw may then easily be reduced to less than 50 µm per turn. The underside of the movable body 13 has a cavity to allow disc member 11 to be bent upwards underneath it.

This bending also exerts a locking force on the screw 12 so that it does not rotate unintentionally.

A sealing member 14 can be integrated into the head of the adjustment screw to seal the inside of the chassis 10 from the outside. This may be advantageous in environments where there is a risk of explosion.

Figure 3:
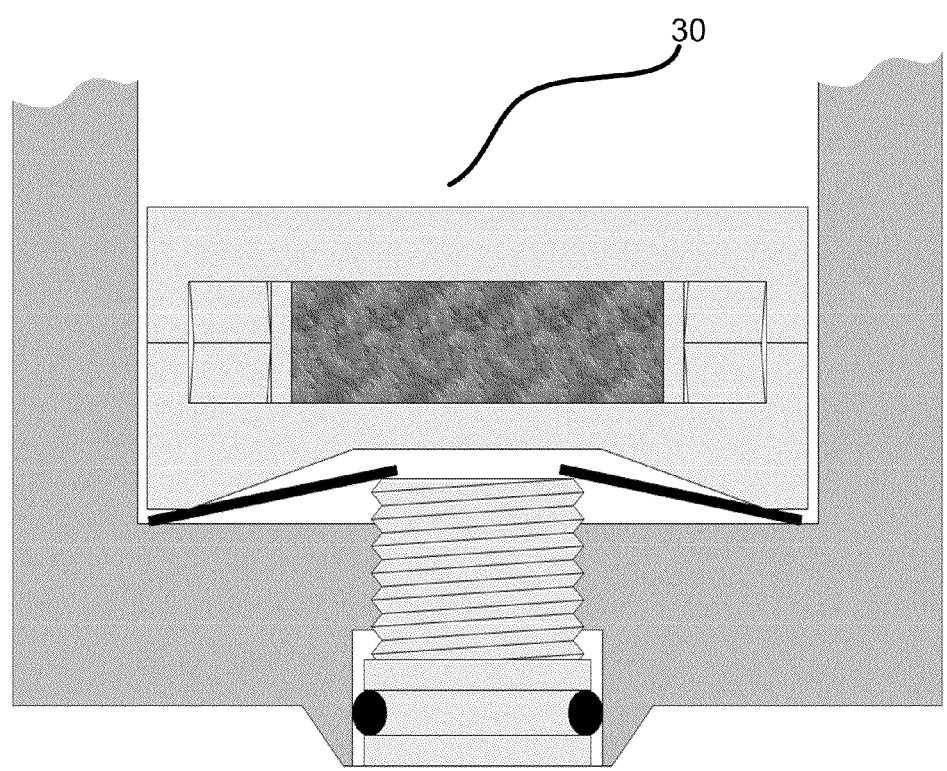
FIG. 3 shows an embodiment where a temperature compensation element is combined with a mechanical trimming device.

FIG. 3 shows an exemplary embodiment where a temperature compensation element 30 is positioned in series with the trimming device. Here, the temperature compensation element 30 replaces the movable circular body 13. In the present exemplary embodiment, the parts are circular. However, the geometry of the device is not restricted to these shapes, but may also be polygons, ellipses, etc.

For example, a piezoelectric crystal stack may be arranged inside the chassis 10 and above the circular body 13 to provide mechanical trimming of the stroke length of the crystal stack.

Other embodiments may also be included where extremely small adjustment lengths are needed, e.g., for other types of actuator units.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. The scope of the invention is, therefore, defined by the following claims. The words "including" and "having," as used herein, including in the claims, shall have the same meaning as the word "comprising."

What is claimed is:

1. A mechanical trimming device comprising:
    an adjustable screw;
    a first body having at least one threaded through hole that rotatably partly encloses said adjustable screw;
    a movable second body that is movable relative to said first body and has a cavity into said second body, wherein said cavity accommodates a proximal end of said screw when said second body is laid against said first body;
    at least one disc member having a center and an outer edge and being positioned between said first and said second bodies, wherein said cavity is facing said disc member and has an edge lying inside of said outer edge of said disc member so that said outer edge of said disc member lies between said first and said second body;
    wherein said screw, when adjusted, can raise said center of said disc member in that said disc member works as a lever having a first distributed contact point against said cavity edge of said second body and a second distributed contact point along said outer edge of said disc member against the surface of said first body, wherein said first body is moved in an axial direction of said screw with a substantially smaller motion than said screw.

2. The mechanical trimming device according to claim 1, wherein said disc member includes slits running towards said center.

3. The mechanical trimming device according to claim 1, wherein said disc member comprises sectioned elements directed towards the center.

4. The mechanical trimming device according to claim 1, wherein said disc member is circularly shaped.

5. The mechanical trimming device according to claim 1, wherein said disc member is polygonal.

6. The mechanical trimming device according to claim 1, wherein said mechanical trimming device is connected in series to a mechanical temperature compensating element.

7. The mechanical trimming device according to claim 1, wherein an actuator unit is connected in series to said mechanical trimming.

8. A method for trimming in an orthogonal direction relative to the surface of the mechanical trimming device, wherein the method comprises adjusting a screw for raising the center of a disc member so that said disc member acts as a lever having a first distributed contact point against a second body's, relative to a first body, cavity edge and a second distributed contact point along the outer edge of said disc member against a surface of the first body.

9. The method according to claim 8, wherein said lever is moved along an axial direction of said screw with a movement substantially less than the screw.

* * * * *